United States Patent [19]

Doi

[11] Patent Number: 4,622,848
[45] Date of Patent: Nov. 18, 1986

[54] FLAT BELT TYPE TESTING APPARATUS FOR MEASURING THE CORNERING CHARACTERISTICS OF A TIRE

[75] Inventor: Terumasa Doi, Ikeda, Japan

[73] Assignee: Sumitomo Rubber Industries, Ltd., Kobe, Japan

[21] Appl. No.: 758,239

[22] Filed: Jul. 24, 1985

[30] Foreign Application Priority Data

Aug. 7, 1984 [JP] Japan .................. 59-165800

[51] Int. Cl.⁴ ........................................ G01M 17/02
[52] U.S. Cl. ........................................ 73/146; 73/8
[58] Field of Search .................. 73/146, 9, 8, 117

[56] References Cited

U.S. PATENT DOCUMENTS 4,324,128 4/1982 Langer .................................. 73/146
4,458,527 7/1984 McFarland et al. ................... 73/146

Primary Examiner—Donald O. Woodiel
Attorney, Agent, or Firm—Armstrong, Nikaido, Marmelstein & Kubovcik

[57] ABSTRACT

A flat belt type testing apparatus for measuring the cornering characteristics of a tire has a pair of rotatable drums around which an endless steel belt is stretched. A tire is supported on the endless steel belt by water jets ejected from a water bearing equipped below the endless steel belt. Waterdrops attached to the reverse side of the endless steel belt are removed by a rear wiper pressed against the endless steel belt downstream of the water bearing. An air blower mechanism placed between the water bearing and the rear wiper includes at least one air pipe having air jet holes for ejecting air under high pressure against the reverse side of the endless steel belt to remove waterdrops from the endless steel belt. Since water can completely be removed from the endless steel belt by the air blower mechanism and the wiper, the drums are free from rust, and a centering sensor equipped close to the endless steel belt is not subjected to a detection failure due to getting wet with water.

10 Claims, 6 Drawing Figures

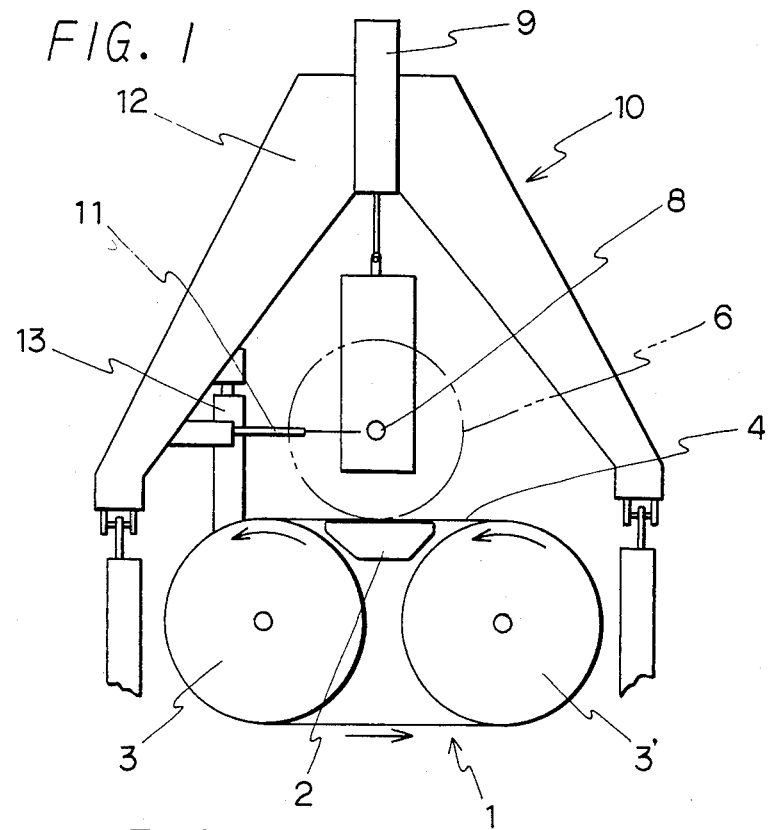
FIG. 1
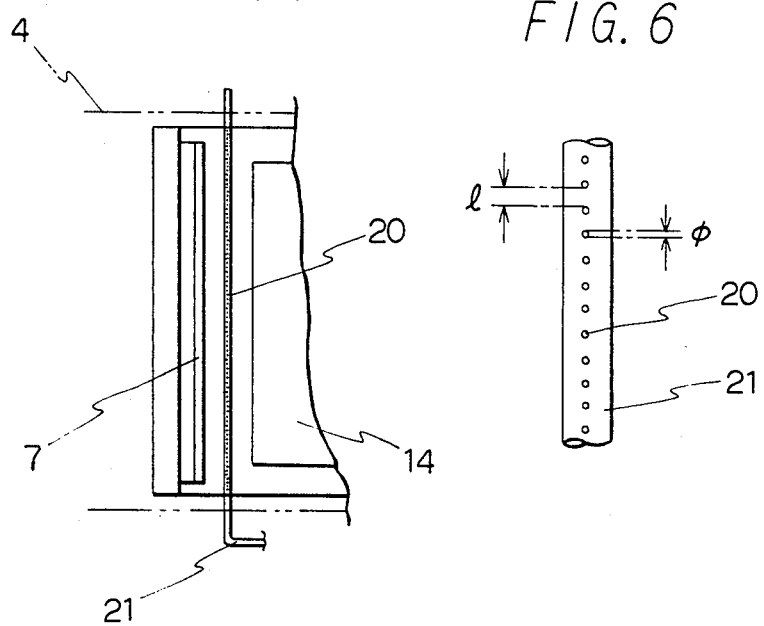
FIG. 4
FIG. 6

FLAT BELT TYPE TESTING APPARATUS FOR MEASURING THE CORNERING CHARACTERISTICS OF A TIRE

BACKGROUND OF THE INVENTION

The present invention relates to an improvement in a flat belt type testing apparatus for measuring the cornering characteristics of a tire.

As illustrated in FIGS. 1 to 3 of the accompanying drawings, a conventional flat belt type testing apparatus for tires includes a mechanism 2 for bearing a load by water pressure known as a water bearing provided within an endless steel flat belt conveyer system 1. An endless steel belt 4 is stretched around two rotatable drums 3a, 3b in order to support a load applied by tire 6 with high-pressure water jets applied to the reverse side of the endless steel belt 4. Waterdrops attached to the reverse side of the endless steel belt 4 while it travels are removed by wipers 7a, 7b. When the traveling speed of the endless steel belt 4 is increased in order to add the testing speed, the waterdrops can not sufficiently be wiped off only by means of the wipers 7a, 7b. Further, the wipers 7a, 7b tend to be deformed or curved due to using for a long period of time, and then waterdrops might not be removed surely because of incomplete contact of wipers 7a, 7b with the endless steel belt 4. As a result, there exist problems that the rotatable drums 3a, 3b are apt to rust or a centering sensor equipped close to an edge of the endless steel belt 4 is liable to get wet and a detection failure occurs.

Accordingly, it is an object of the present invenion to provide a flat belt type testing apparatus for measuring the cornering characteristics of a tire, the testing apparatus has a mechanism 2 for bearing a load by water pressure capable of easily and completely removing waterdrops from the endless steel belt.

SUMMARY OF THE INVENTION

According to the present invention, there is provided a flat belt type testing apparatus for measuring the cornering characteristics of a tire, comprising an endless steel belt conveyer having a mechanism for bearing a load by water pressure, and a loading mechanism which supports a tire rotatably and is vertically movable in order to apply a desired load to a tire being in contact with a traveling endless steel belt at a desired camber angle or slip angle, the mechanism for bearing a load by water pressure has an air blower mechanism placed between a base plate and a wiper for blowing air against the reverse side of the endless steel belt in order to remove waterdrops from the reverse side of the endless steel belt.

The above and other objects of the invention will be seen by reference to the description taken in connection with the accompanying drawings.

BRIEF EXPLANATION OF THE DRAWINGS

FIG. 1 is a partially schematic front view of a flat belt type testing apparatus for measuring the cornering characteristics of a tire;

FIG. 4 is a partially schematic plan view of a mechanism for bearing a load by water pressure according to the present invention;

FIG. 6 is a partially plan view of an air pipe according to the present invention, respectively.

DETAILED DESCRIPTION

Figure 2:
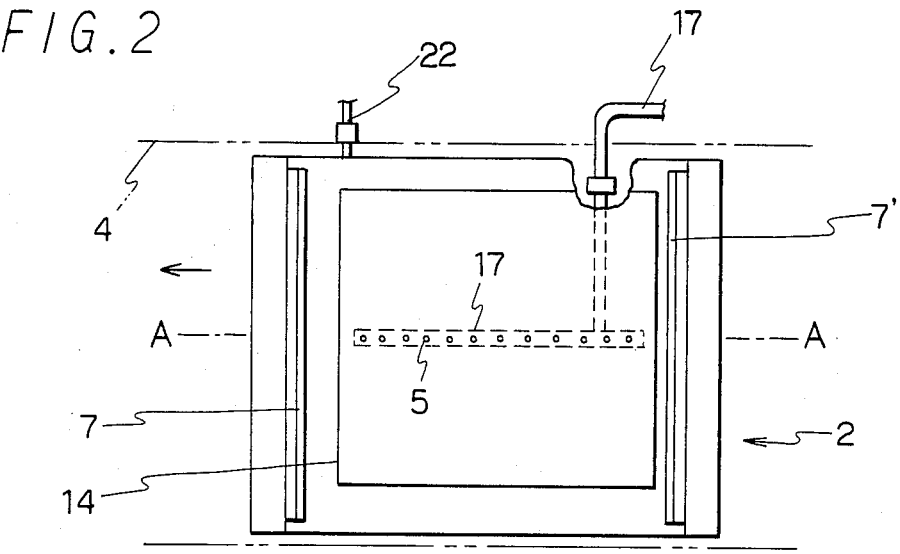
FIG. 2 is a partially schematic plan view of a conventional mechanism for bearing a load by water pressure.

As illustrated in FIG. 1, a flat belt type testing apparatus for measuring the cornering characteristics of a tire according to the present invention primarily comprises a endless steel flat belt conveyer system 1 and a loading mechanism 10. The endless steel flat belt conveyer system 1 comprises two rotatable drums 3a, 3b a endless steel belt 4 stretched around the drums 3a, 3b and a mechanism for bearing a load by water pressure (hereinater referred to as "water bearing") 2 provided within the steel belt 4. The loading mechanism 10 supports a tire rotatably on a shaft 8 and is vertically movable by virtue of a hydraulic cylinder 9 in order to apply a desired load to a tire being in contact with a traveling endless steel belt. The flat belt type testing apparatus also includes a mechanism 11 for giving a slip angle to the tire 6 supported on a shaft 8 and a mechanism 13 for giving a camber angle to the tire 6 by way of the inclination of an A-shape frame 12 of the loading mechanism 10. The cornering characteristics of the tire 6 while it travels on the steel belt 4 under various conditions (slip angles and camber angles) are detected by a load cell mounted on the shaft 8. The foregoing construction is known.

Figure 3:
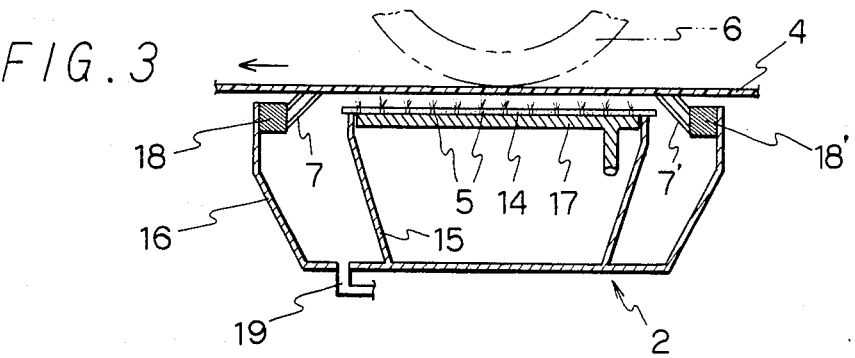
FIG. 3 is a vertical sectional view taken along the line A—A of FIG. 2.

As illustrated in FIGS. 2 and 3, the water bearing 2 comprises a base plate 14 (for example made of Teflon) having a plurality of water jet holes 5 made therein. The base plate 14 is detachably supported on a support frame 15 keeping a small gap in relation to the endless steel belt 4. The support frame 15 is fixed to a casing 16 supported on a cross frame (not shown). A water supply pipe 17 extends along the water jet holes 5 in the base plate 14 for ejecting water through the water jet holes 5 under a pressure of 1 kg/cm$^2$. The ejected water jets are applied to the endless steel belt 4 in order to support a tire under a load (for example under the load of maximum 2.4 tons for a light-truck) as well as the endless steel belt 4. Rear and front, wipers 7, 7' are supported by wiper supports 18, 18'. Each of the wipers 7, 7' has double edges having its terminal edges always pressed against the reverse side of the endless steel belt 4 by springs (not shown). The rear wiper 7 has a function to wipe waterdrops off the reverse side of the endless steel belt 4, while the front wiper 7' has a function to remove dust from the endless steel belt 4. The water dropped from the base plate 14 is drained by a drainpipe 22.

Figure 5:
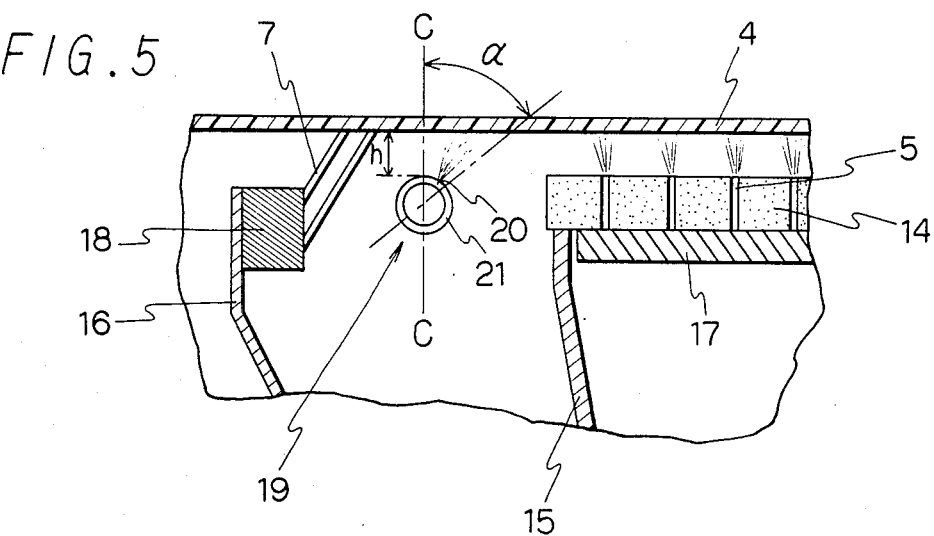
FIG. 5 is a partially vertical sectional view of a mechanism for bearing a load by water pressure according to the present invention.

The water bearing 2 according to the present invention is of the same construction as conventional water bearings except for the following details: As illustrated in FIGS. 4 to 6, an air blower mechanism 19 is placed between the base plate 14 and the rear wiper 7. The air blower mechanism 19 comprises at least one air pipe 21 having a plurality of air jet holes 20 for blowing high-pressure air under a pressure of 2 to 7 kg/cm$^2$ against the reverse side of the endless steel belt 4 and an air source (not shown) connected to the air pipe 21. The air pipe 21 is placed close to the reverse side of the endless steel belt 4 and extends over the full width of the endless steel belt 4. The distance h between the top of the air pipe and the reverse side of the endless steel belt is 5 to 10 mm. The direction of air jet holes 20 is within the angle α of about 60° (for example) from the vertical plane C—C passing through the center of the air pipe 21. Each of the air jet holes 20 is 1 to 3 mm in diameter. The air jet holes are spaced at intervals of l, for example from 5 to 10 mm.

The air blower mechanism 19 is operated or stopped by switching depending upon traveling or stopping the endless steel flat belt conveyer system 1.

As mentioned above, the present invention comprises the air blower mechanism 19 placed close to the reverse side of the endless steel belt 4, on this side of the rear wiper 7a of the water bearing 2 for blowing high-pressure air against the reverse side of the endless steel belt 4. Therefore, any waterdrop attached to the reverse side of the endless steel belt 4 can completely be removed therefrom. As a result, the conventional problems of the rust of the rotatable drums and the detection failure of the centering sensor can be completely eliminated.

It is further understood by those skilled in the art that the foregoing description is a preferred embodiment of the disclosed device and that various changes and modifications may be made in the invention without departing from the spirit and scope thereof.

What is claimed is:

1. A flat belt type testing apparatus for measuring the cornering characteristics of a tire, comprising an endless steel flat belt conveyer system having a mechanism for bearing a load by water pressure, and a loading mechanism which supports a tire rotatably and is vertically movable in order to apply a desired load to a tire being in contact with a traveling endless steel belt at a desired camber angle or slip angle; said mechanism for bearing a load by water pressure having an air blower mechanism placed between a base plate and a wiper for blowing air against the reverse side of the endless steel belt in order to remove waterdrops from the reverse side of the endless steel belt.

2. The testing apparatus of claim 1, wherein an air blower mechanism comprises at least one air pipe.

3. The testing apparatus of claim 2, wherein the air pipe extend over the full width of an endless steel belt.

4. The testing apparatus of claim 2, wherein the distance between the top of the air pipe and the reverse side of the endless steel belt is 5 to 10 mm.

5. The testing apparatus of claim 4, wherein the opening is a plurality of air jet holes.

6. The testing apparatus of claim 4, wherein the pressure of air blown through the opening is 4 to 5 kg/cm$^2$.

7. The testing apparatus of claim 2, wherein the air pipe has an opening for blowing air.

8. The testing apparatus of claim 7, wherein the opening is within the angle of about 60° from the vertical plane passing through the center of the air pipe.

9. The testing apparatus of claim 7, wherein each of the air jet holes is 1 to 3 mm in diameter.

10. The testing apparatus of claim 7, wherein the air jet holes are spaced at intervals of 5 to 10 mm.

* * * * *